US006239943B1

(12) United States Patent
Jennings et al.

(10) Patent No.: US 6,239,943 B1
(45) Date of Patent: *May 29, 2001

(54) SQUEEZE FILM DAMPING FOR A HARD DISC DRIVE

(75) Inventors: David John Jennings; Hans Leuthold, both of Santa Cruz; Lakshman Nagarathnam, Capitola; Steve Gonzalez, Davenport; Dean A. Tarrant, San Jose; Gunter Heine, Aptos; Raquib U. Khan, Pleasanton, all of CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/727,858

(22) Filed: Oct. 8, 1996

Related U.S. Application Data

(63) Continuation of application No. 08/278,796, filed on Jul. 22, 1994, now abandoned.

(51) Int. Cl.[7] .................................................. G11B 33/08
(52) U.S. Cl. ........................................................ 360/97.02
(58) Field of Search ............................... 360/97.01–97.03, 360/900, 903, 103; 369/258, 263

(56) References Cited

U.S. PATENT DOCUMENTS

| 4,268,878 | * | 5/1981 | Kearns ............................... 360/97.02 |
| 4,581,668 | * | 4/1986 | Campbell .......................... 360/97.02 |
| 4,583,213 | * | 4/1986 | Bracken et al. .................. 360/97.02 |
| 5,235,482 | * | 8/1993 | Schmitz ............................. 360/97.02 |
| 5,282,100 | * | 1/1994 | Tacklind et al. .................. 360/97.02 |

FOREIGN PATENT DOCUMENTS

| 54-154310 | * | 12/1979 | (JP) ................................... 360/97.03 |
| 56-137559 | * | 10/1981 | (JP) ................................... 360/97.03 |
| 4289577 | * | 10/1992 | (JP) . |
| 5-234327 | * | 9/1993 | (JP) . |

* cited by examiner

Primary Examiner—George J. Letscher
(74) Attorney, Agent, or Firm—Flehr Hohbach Test Albritton & Herbert LLP

(57) ABSTRACT

A spindle motor is described having a motor stator, a motor rotor, the motor being energized to cause rotation of the rotor supporting a single disc or a stack of discs which is mounted in such a way that the rotating bottom or top (or both) disc surface is closely adjacent to a stationary disc drive casting surface. The squeeze film action in the remaining air gap provides significant damping of the disc vibration. Typical implementation use air gaps of 0.004"–0.006" for 2½" drives and 0.006"–0.10" for 3½" drives.

4 Claims, 19 Drawing Sheets

Axial Mode Shape

Forward & Backward Gyro Mode Shape

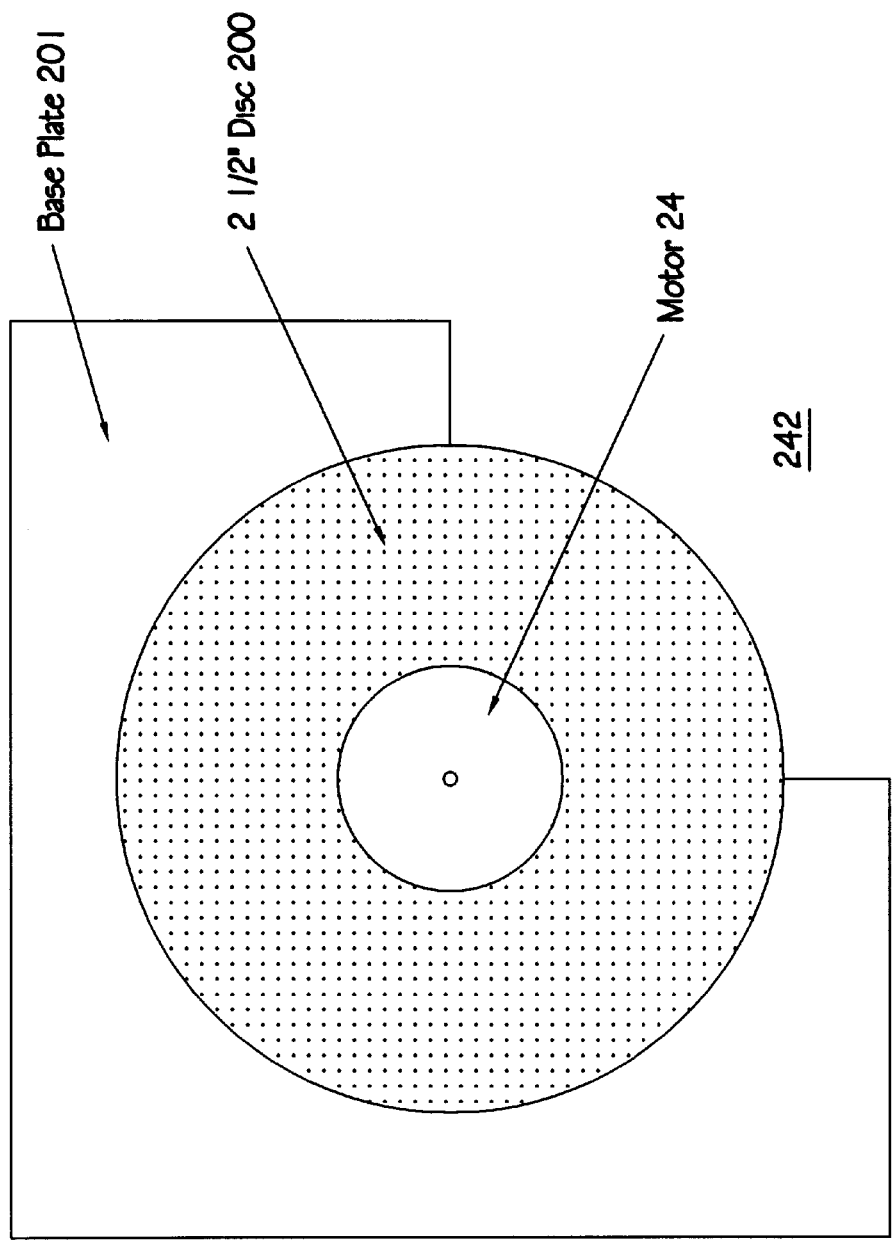

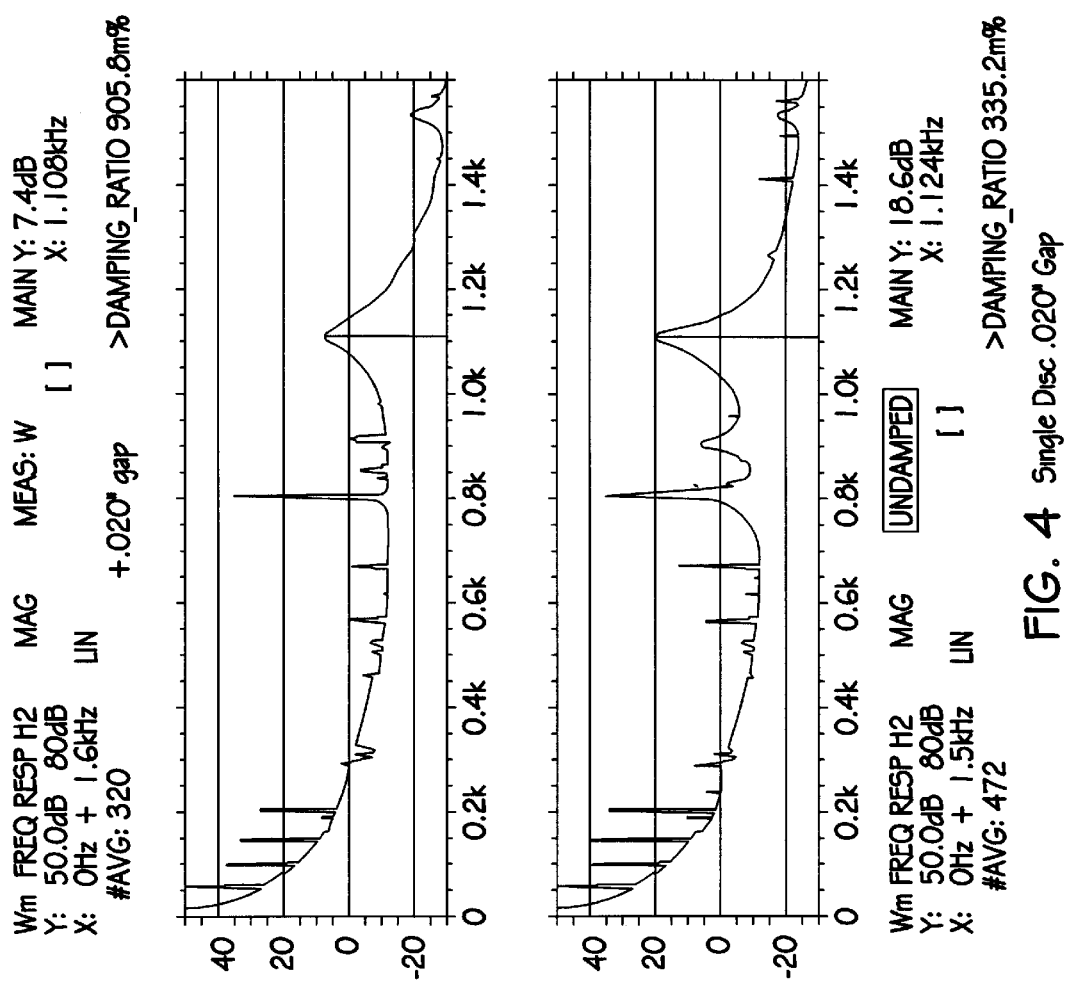
FIG. 4 Single Disc .020" Gap

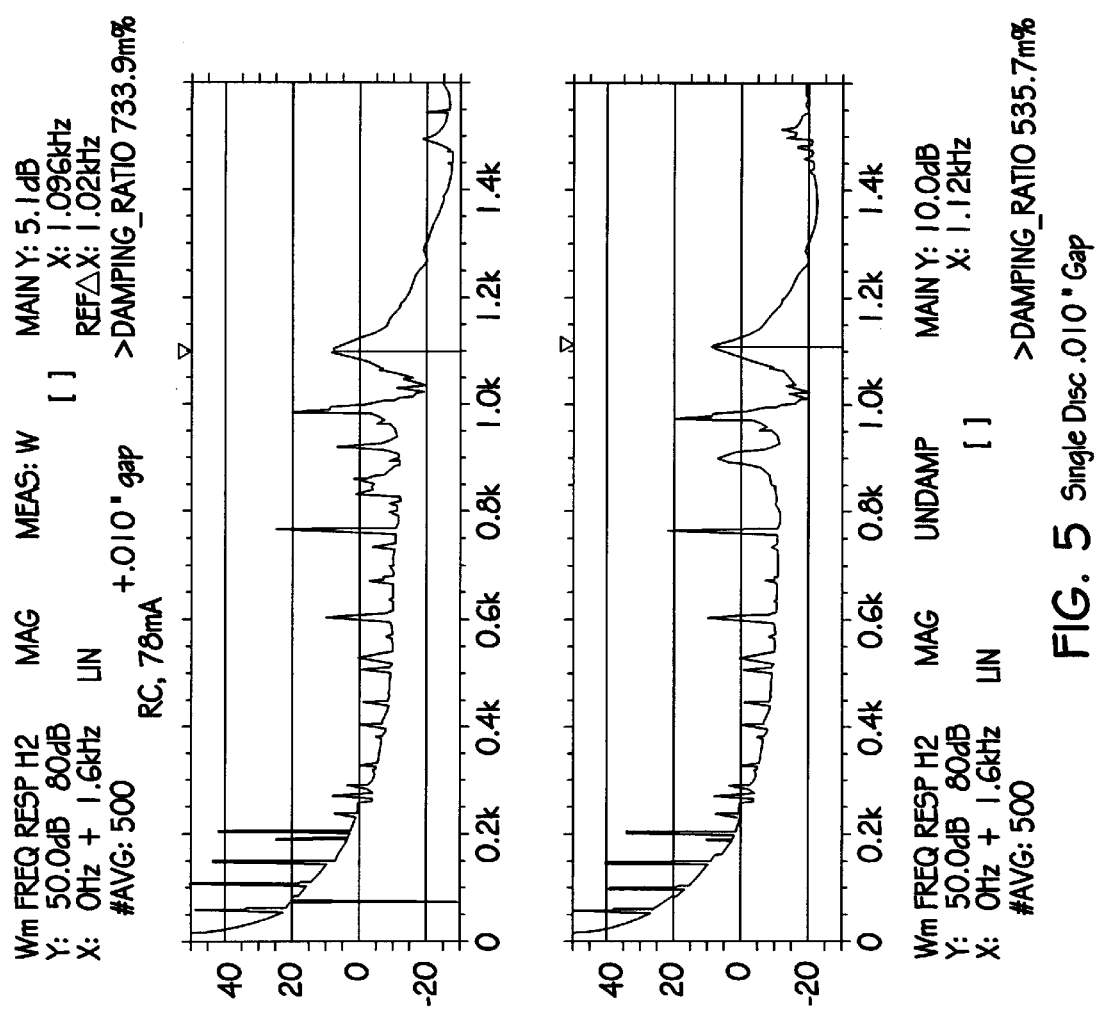
FIG. 5 Single Disc .010" Gap

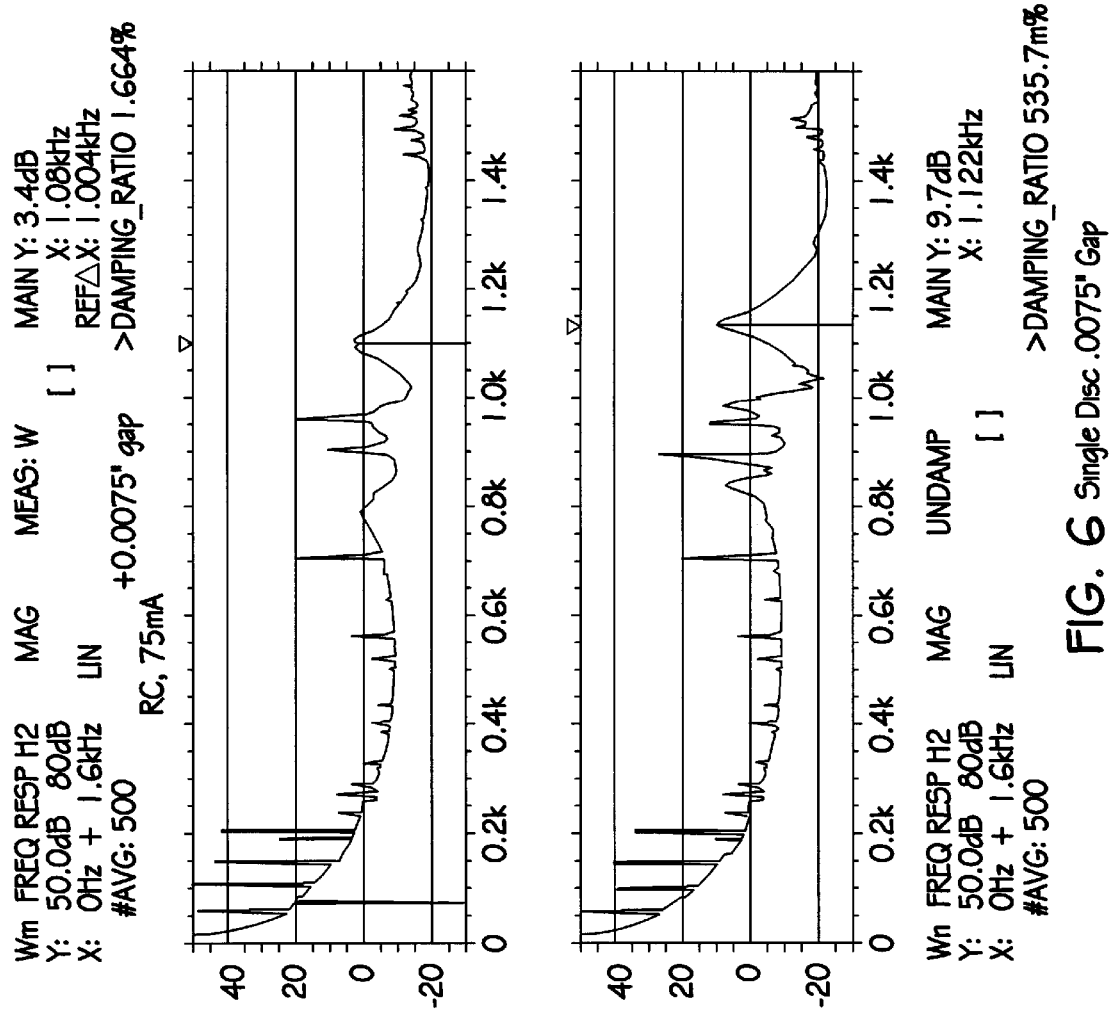
FIG. 6 Single Disc .0075" Gap

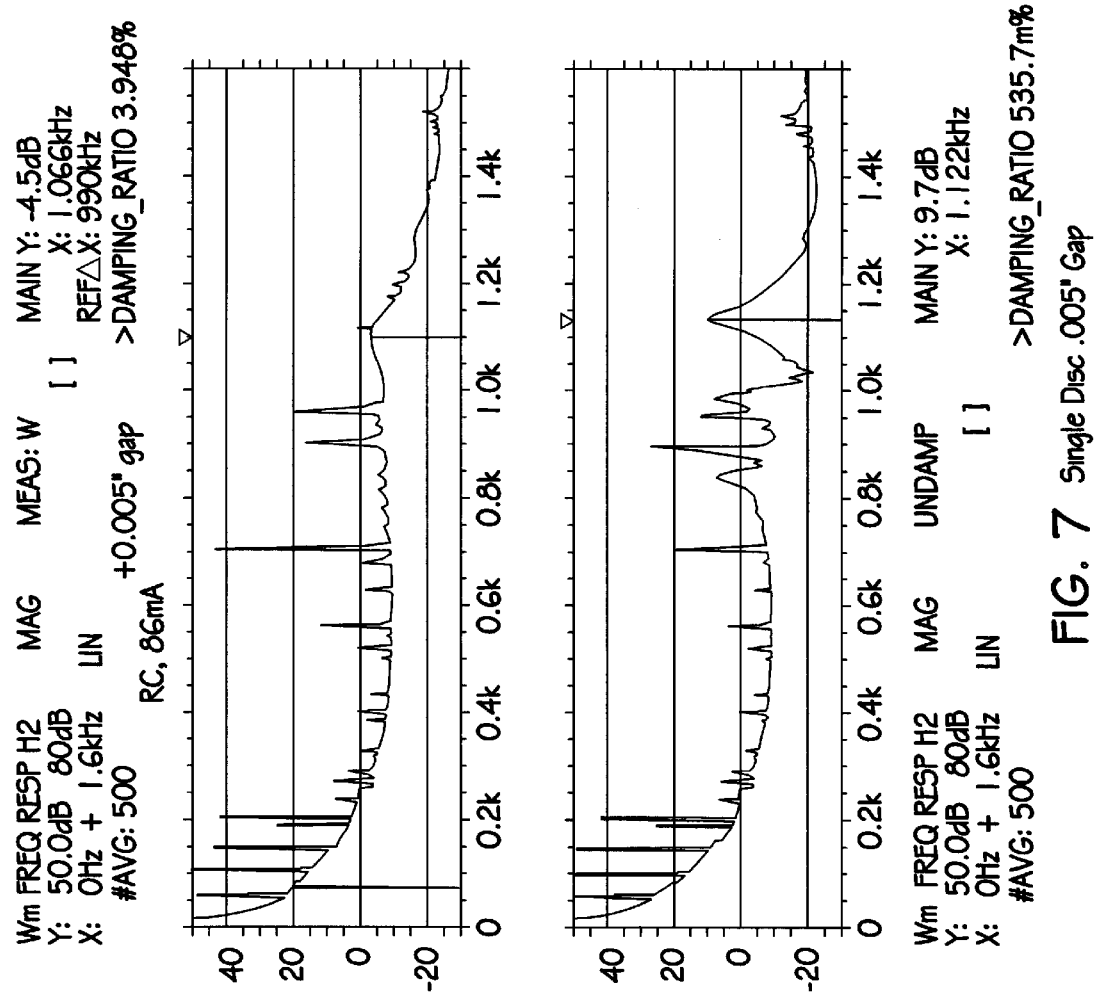
FIG. 7 Single Disc .005" Gap

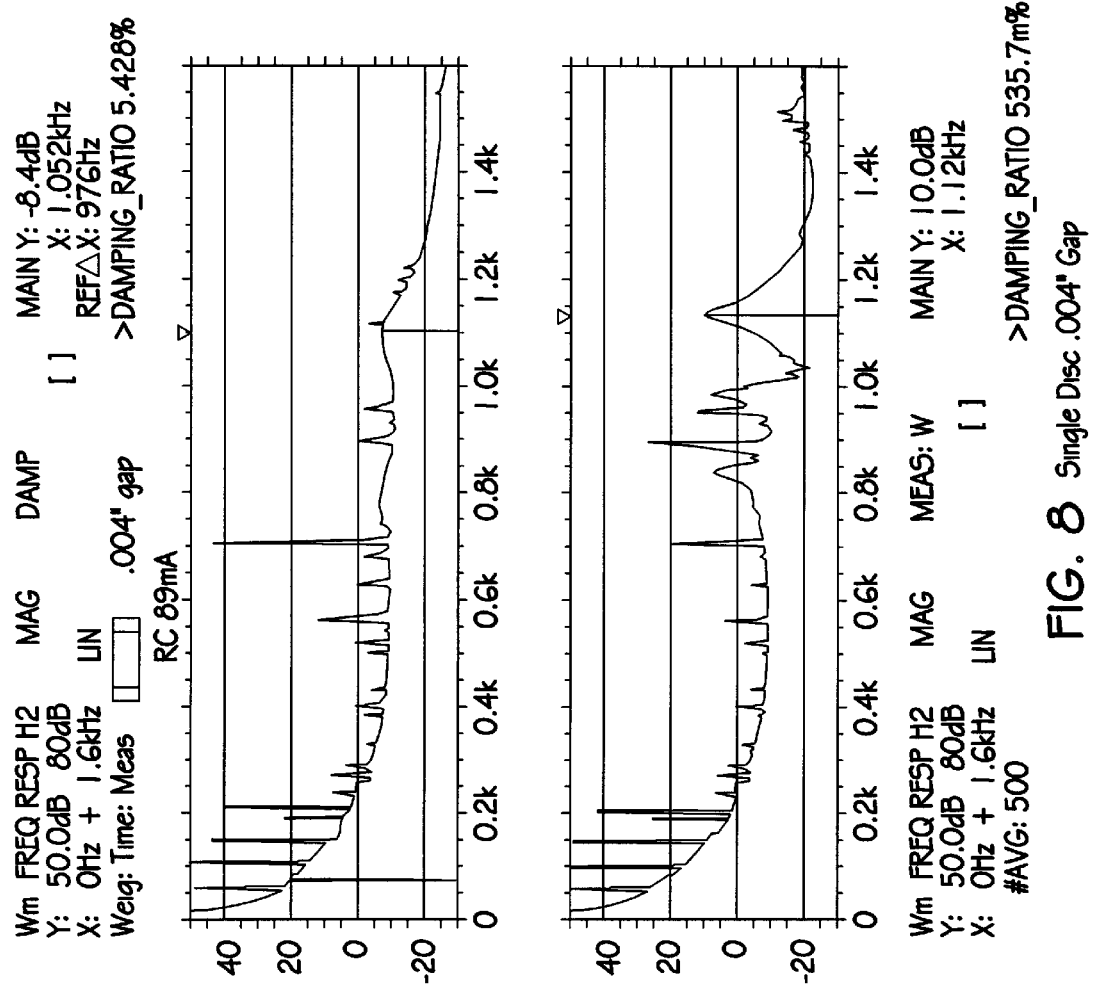
FIG. 8 Single Disc .004" Gap

Axial Mode Amplitude as a function of the Gap

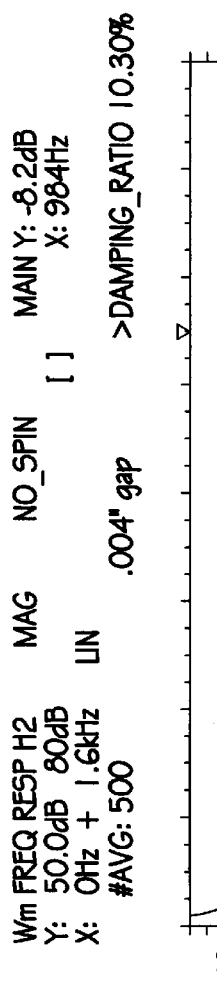
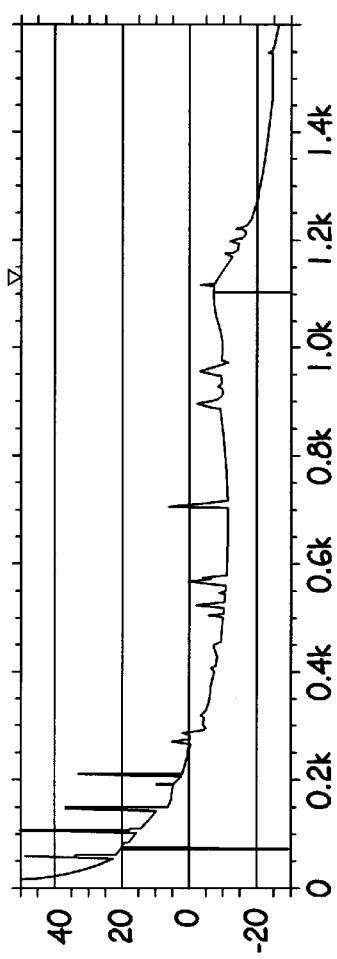
FIG. 10  Frequency Response of a stationary and Spinning Disc (.004" Gap)

FIG. 13  Vibration of Top Disc with Squeeze Film Damping on Bottom Disc (Gap .020")

FIG. 14  Vibration of Top Disc with Squeeze Film Damping on Bottom Disc (Gap .004")

SQUEEZE FILM DAMPING FOR A HARD DISC DRIVE

This application is a con Ser. No. 08/278,796 filed Jul. 22, 1994, now abandoned.

FIELD OF THE INVENTION

The present invention relates generally to a hard disc drive support system, and more specifically to means for damping out vibrations in a rotating disc utilized in a hard disc drive.

The present invention relates to mounting of a rotating discs or disc so that the disc rotates in a very stable fashion without vibration or the like.

BACKGROUND OF THE INVENTION

With the development of hard disc drives having a high storage density, demand has been created for improvements in the performance of the spindle motors and mounting for the disc. High storage density is achieved with reduced width and spacing of the circular tracks holding the stored information. Any vibration, wobbling or deformation of the disc as it rotates will create a temporary misalignment between the read/write transducer and the circular track of stored information. Such misalignment may lead to read/write errors. Hence, high storage density depends, among other characteristics, on damping of any disc movement and the stiffness of the mounting which positions the rotating disc relative to the transducer.

Most current disc drive designs have very small vibrational damping characteristics. This is a problem because vibration can easily be induced into a mechanical system. Any mechanical system will have a series of natural frequencies, i.e. frequencies at which the system prefers to resonate. Each of these frequencies has a corresponding mode shape. In standard disc drives there are series of these natural frequencies related to the vibration of the discs. These frequencies, and their corresponding mode shapes can be predicted by mathematical modeling; the existence of these resonance modes has been verified by experimental testing. For example, FIGS. 1A and 1B are plots of the vibration measured on a spinning disc as a function of frequency with a white noise excitation. These plots will be discussed in further detail below. However, these plots clearly show both forward and backward gyro mode (see FIG. 1A), that is frequencies at which the discs vibrate back and forth like a seesaw with one rotating diameter as a stationary node. These plots also show an axial vibration of the disc (see FIG. 1B). At this frequency the discs vibrate up and down in an axisymmetric umbrella shape.

Vibration in either of these modes would obviously have the potential for causing significant misalignment between datatrack and transducer. The problem has become more significant with the use of thinner discs. Thinner discs are less stiff and result in lower resonance frequencies as well as in increased amplitude of deformation or distortion of the disc.

Some disc drive designs in the past have utilized a dampening material in the base or top cover to help improve acoustics. However, this sort of damping, while improving acoustics, does very little to stabilize the rotor dynamic system of motor and discs. Moreover, it is well known that the ball bearings used to mount most spindle motors have very low damping characteristics.

If sufficient damping could be introduced into the vibrational system of motor and discs, several problems could be improved: operational vibration, shock resistance, rotor dynamic stability problems, and parametric stability problems (e.g. stiffness dependent on angular position of rotor related to ball bearing misalignment).

SUMMARY OF THE INVENTION

In view of the above described circumstances, it is an object of the present invention to provide a spindle motor which is designed so that the rotational stability during high speed rotation is enhanced, and vibrations are significantly damped out.

To this end, the present invention provides a spindle motor having a motor stator, a motor rotor, the motor being energized to cause rotation of the rotor supporting a single disc or a stack of discs which is mounted in such a way that the rotating bottom or top (or both) disc surface is closely adjacent to a stationary disc drive casting surface. The squeeze film action in the remaining air gap provides significant damping of the disc vibration. Typical implementation use air gaps of 0.004"–0.006" for 2½" drives and 0.006"–0.010" for 3½" drives.

It should be noted that squeeze film damping has been used in industrial turbo machines as well as aircraft engines in the past. However, in these applications the damper is incorporated into the bearing support as shown in the following FIGS. 2A, 2B, 2C. FIG. 2A illustrates a squeeze film bearing damper as applied to a rolling element bearing in an aircraft turbojet engine. A clearance space (typically 0.005–0.0010") is provided around the outer race and supplied with oil. The outer race is pinned or keyed to prevent rotation but is allowed to orbit. FIG. 2B illustrates a similar hydrodynamic bearing where oil separates a shaft which is free to whirl and rotate inside a housing. FIG. 2C illustrates an alternative damper, where the outer race of a rolling element bearing or the bearing segment of a hydrodynamic bearing is mounted in the inner element of the damper. A fluid oil film separates the inner and outer damper elements. Dampers are generally supplied with oil at the center either through holes or through a central supply groove. Exit leakage at the ends is controlled by end seals which can be either an o-ring or piston ring design. Thus, all of these design approaches are distinctly different from the approach to be disclosed and claimed herein. Due to the small size of disc drives, squeeze film dampers of the type shown in these figures is not possible. Even if a squeeze film damper could be mounted at the bearing support, the level of damping it would provide would be small. In order for a damper to work efficiently it needs to be placed in a location where the operational levels would otherwise be large. In a disc drive, this location is on the disc surface themselves. Thus, the method of the present invention is to introduce damping directly to the disc surface. In addition, typical squeeze film dampers of the type shown in FIGS. 2A, 2B and 2C are supplied with oil; this concept for disc drives utilizes air.

BRIEF DESCRIPTION OF THE DRAWINGS

FIGS. 3A and 3B shows an experimental test fixture including the basic elements of a disc drive on which this invention is especially useful;

FIGS. 4–14 provide the experimental data which result from tests run on a typical disc drive incorporating this invention;

DETAILED DESCRIPTION OF A PREFERRED EMBODIMENT

Figure 1B:
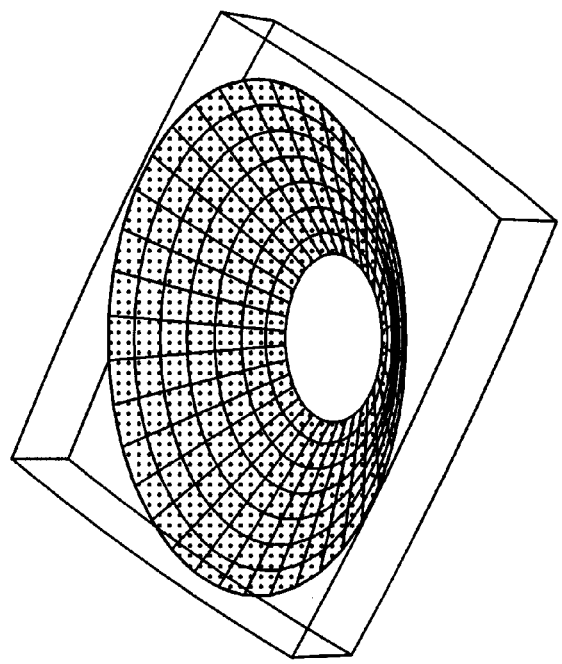
FIGS. 1A and 1B introduce the concept of vibrations as a function of frequency in a spinning disc.
Figure 1A:
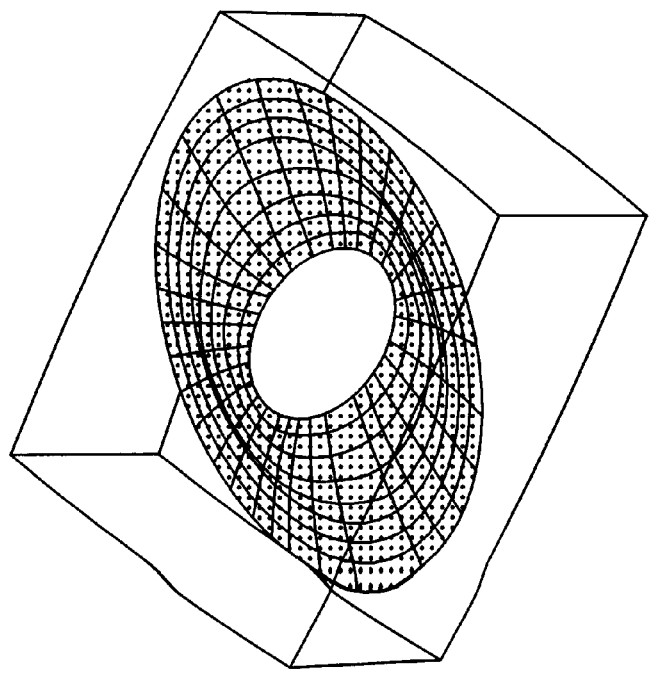
Figure 2A:
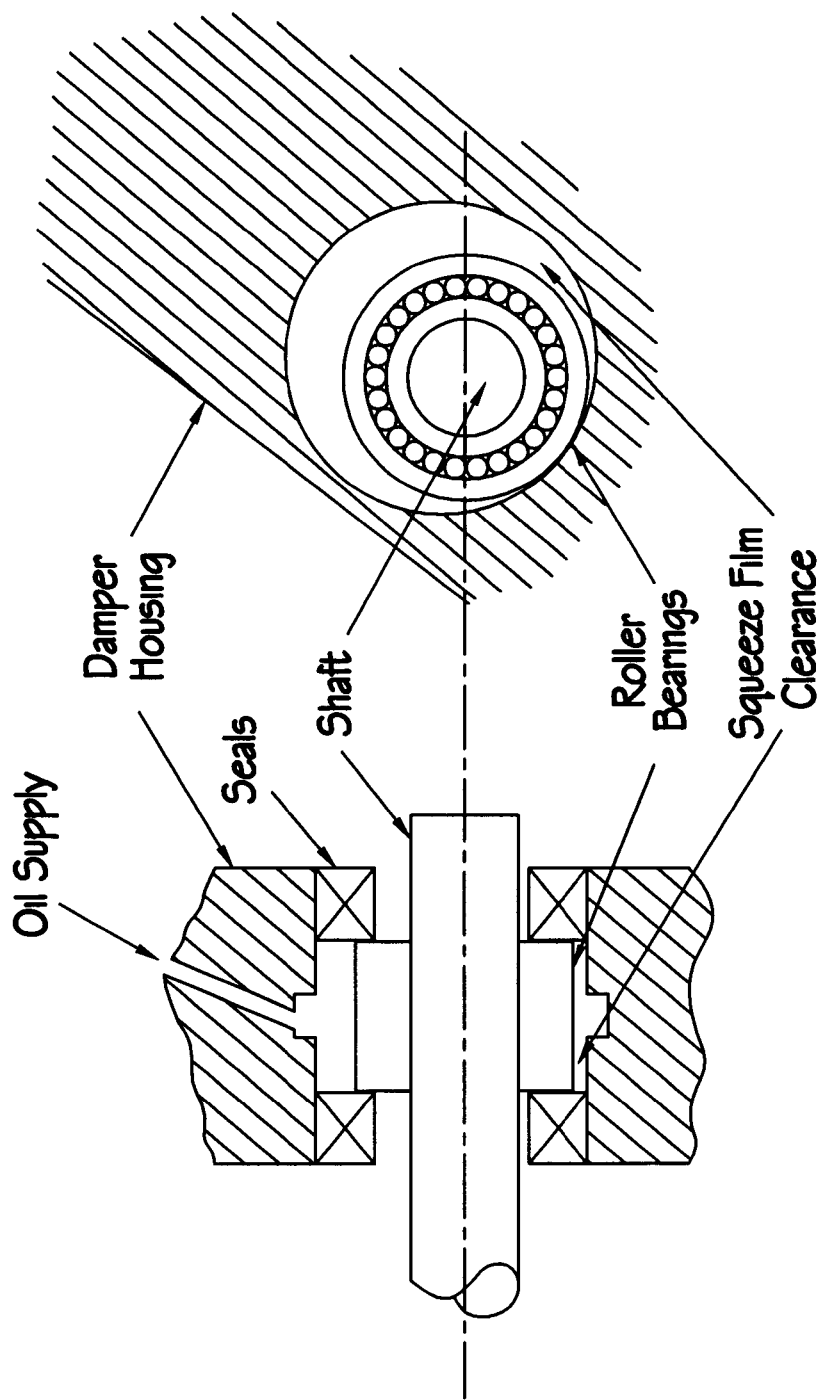
FIGS. 2A, 2B and 2C illustrate prior art squeeze film dampers.
Figure 2B:
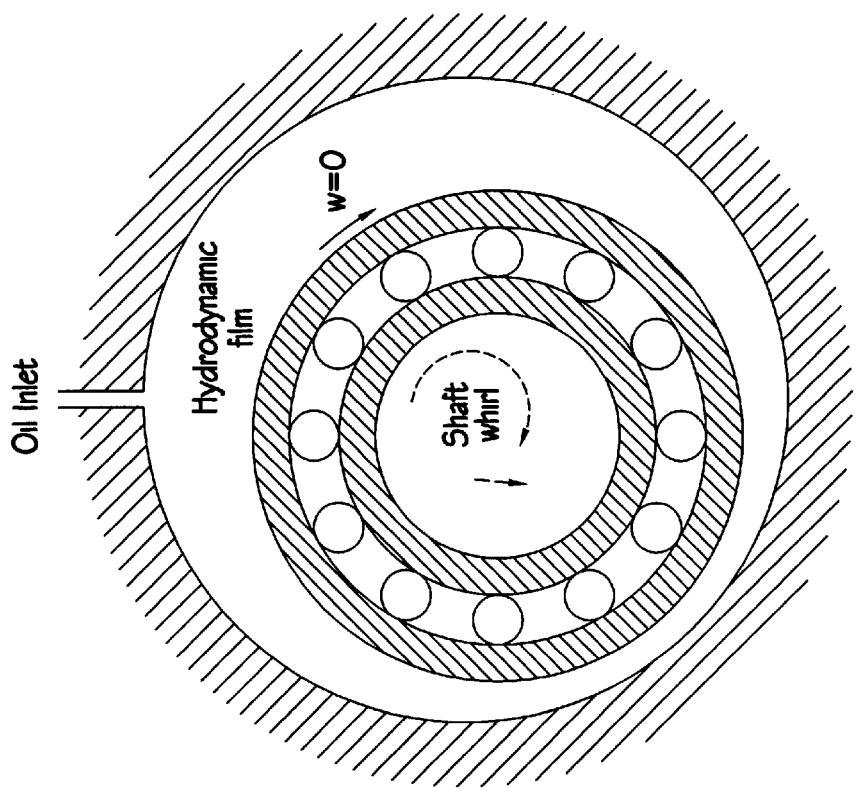
Figure 2C:
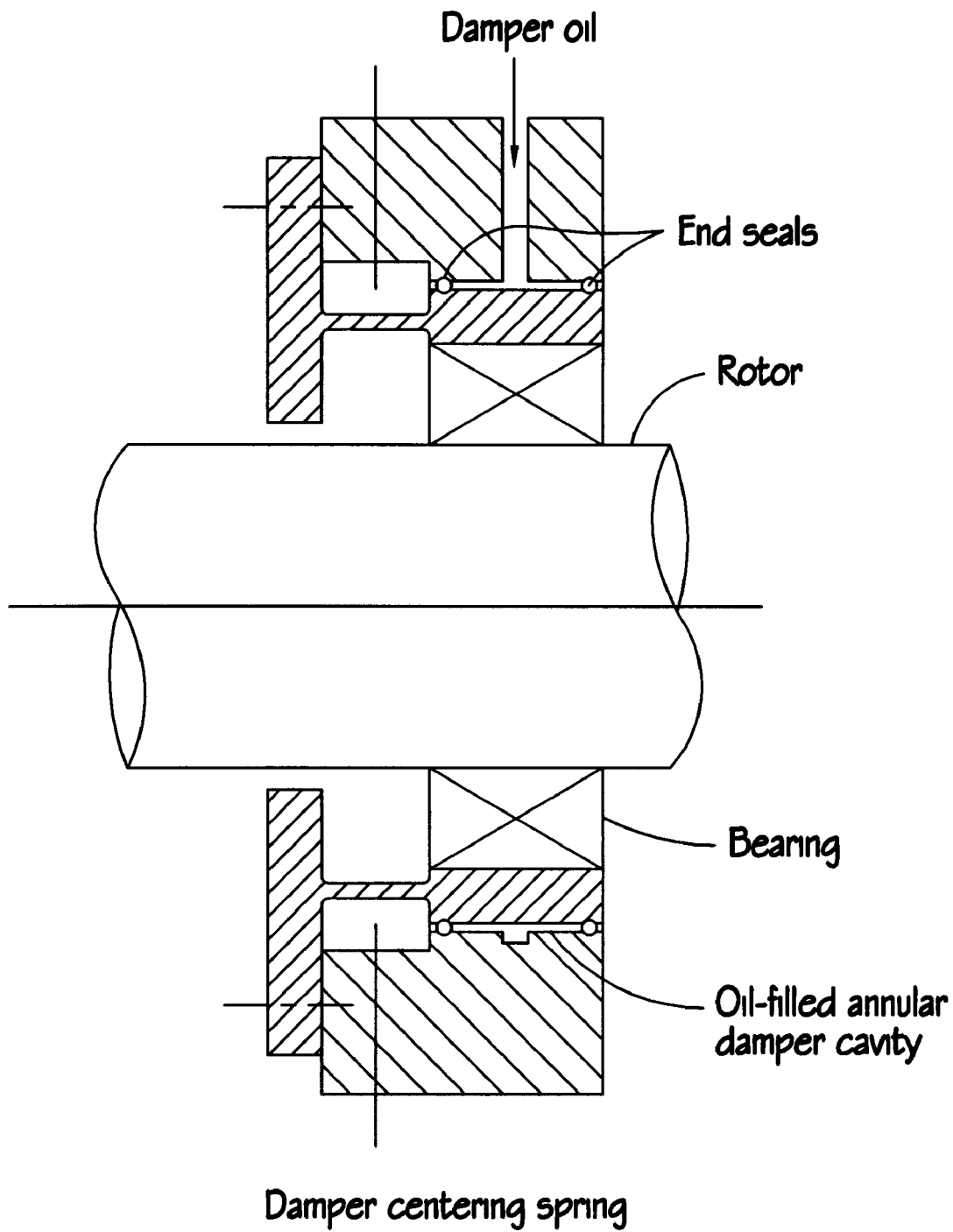

The basic structure of the present invention is relatively simple. The description herein reviews first the theoretical considerations behind the utilization of squeeze film damping by an air film trapped in the narrow gap between a disc surface and the base of the housing, and follows with test results on actual disc drives.

Theoretical Considerations

The fundamental behavior of squeeze film damping is described by Reynold's equation.

$$\frac{\partial}{\partial x}\left(h^3 \frac{\partial p}{\partial y}\right) + \frac{\partial}{\partial y}\left(h^3 \frac{\partial p}{\partial y}\right) = 6\eta\left(U\frac{\partial h}{\partial x} + 2\frac{\partial h}{\partial t}\right) \quad (1)$$

This is the basic Reynold's equation for incompressible flow. (For a complete derivation of Reynold's equation see Carmeron, Alastair, *Basic Lubrication Theory*, 3rd ed. 1981.) For the problem considered here the assumption of incompressibility introduces only a small error. The right hand side consists of two parts:

$$6\eta U \frac{\partial h}{\partial x}, \quad (2)$$

The wedge film term $$12\eta \frac{\partial h}{\partial t}, \quad (3)$$

The squeeze film term

The wedge term results in a stiffness between the two plates. The squeeze film term leads to damping. It is worth noting that the only term dependant on velocity (i.e. the wedge term) does not affect damping, but only stiffness therefore as will be seen below, to have damping of a spinning disc, the system doesn't have to have rotational motion between the two surfaces, there need only be transverse vibrational motion (motion that opens and closes the gap).

Squeeze film damping

Consider two infinitely long parallel plates separated by a gap c. One of the two plates is oscillating in the traverse direction.

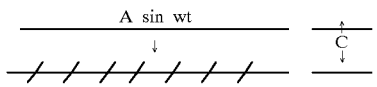

The gap between the plates is: h=sin (ωt)+c. For this problem Reynold's equation simplifies to:

$$h^3 \frac{\partial^2 p}{\partial x^2} = 12\eta \frac{\partial h}{\partial t} \text{ with } h = A\sin(\omega t) + c \quad (4)$$

This equation can be written:

$$\frac{\partial^2 p}{\partial x^2} = 12\eta \frac{A\omega \cos\omega t}{(A\sin(\omega t) + c)^3} \quad (5)$$

integrating, $$p(x, t) = 6\eta \left[\frac{A\omega \cos\omega t}{(A\sin(\omega t) + c)^3}\right] x^2 + c_1 x + c_2 \quad (6)$$

applying boundary conditions: p(0,t)=0, p(L,t)=0 yields:

$$p(x, t) = 6\eta \left[\frac{A\omega \cos\omega t}{(A\sin(\omega t) + c)^3}\right] [x^2 - Lx] \quad (7)$$

This equation describes a parabolic pressure profile that is built up between the two plates as a result of the squeeze film action.

The force on the top plate is calculated by integrating the pressure over the surface.

$$F = \int_0^L p(x,t)dx = -L^3 \eta \left[\frac{A\omega \cos wt}{(A\sin(wt) + c)^3}\right] \quad (8)$$

The velocity of the top plate is A w cos wt, therefore the damping coefficient is:

$$\text{Damping Coefficient} = \frac{L^3 \eta}{(A\sin(wt) + c)^3} \quad (9)$$

The average damping coefficient is:

$$\overline{\text{Damping Coefficient}} = \eta \left(\frac{L}{c}\right)^3 \quad (10)$$

This result says that the damping is proportional to $$\left(\frac{1}{C^3}\right), \quad (11)$$

and that the damping does not depend on the relative horizontal velocity U (in the case of a disc drive, the squeeze film damping does not depend on the spinning speed.) (Test results will appear below.)

Frictional Losses

For two parallel plates, one stationary and the other moving at a velocity U, the velocity profile is linear.

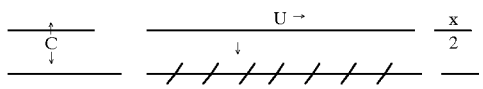

From the definition of viscosity, the shear stress may be written as:

$$\tau = \eta \frac{\partial u}{\partial z} \quad (12)$$

The frictional force is simply:

$$F_{friction} = \int_0^L \tau \, dx \quad (13)$$

Therefore, $$F_{friction} = \frac{U\eta L}{c} \quad (14)$$

This frictional loss is proportional to 1/c. This finding will be compared to experimental results in the next section.

Experimental Results

Figure 3A:
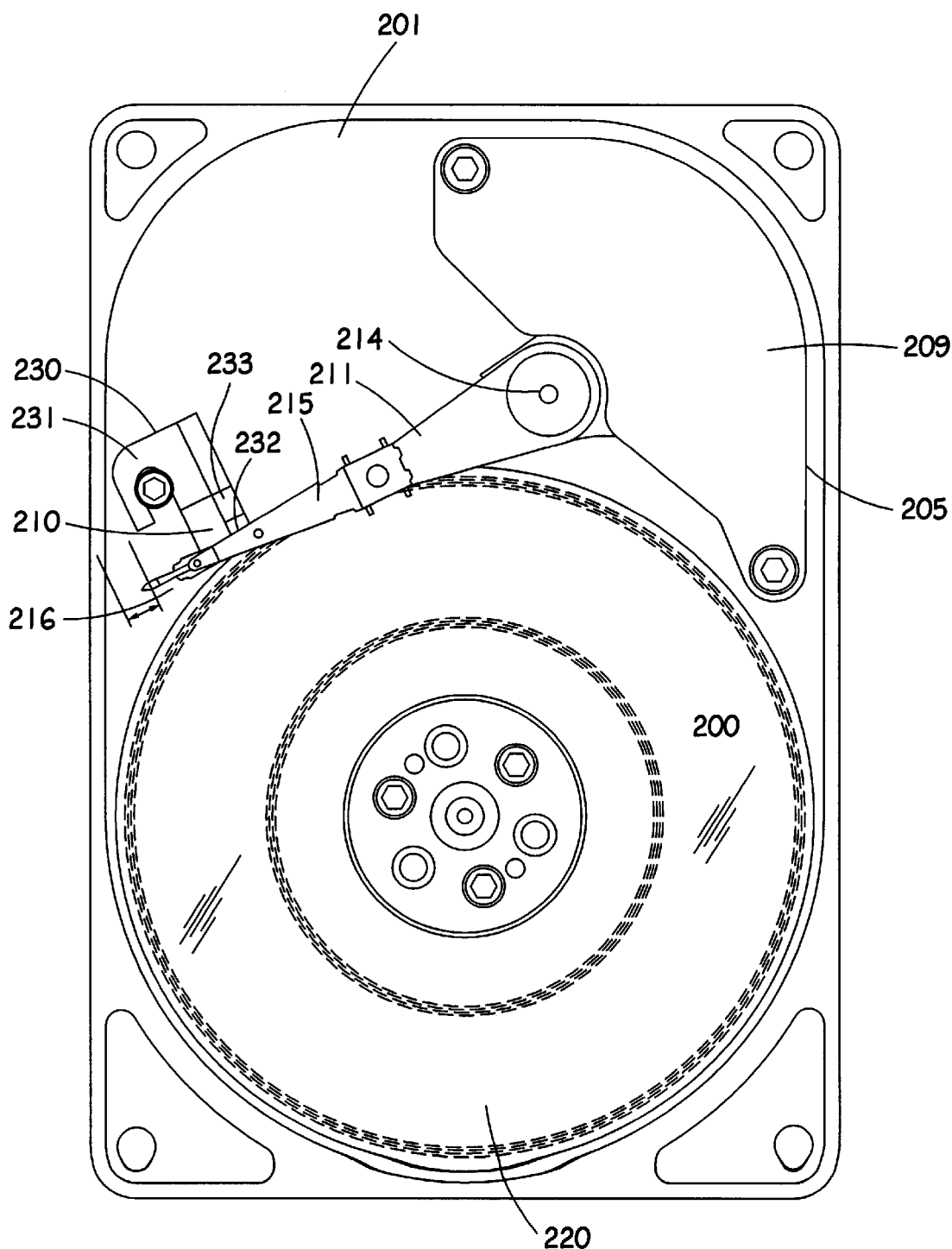

An experimental fixture was made to hold a typical disc drive spindle motor (Seagate ST 9190 style). The height of the motor could be adjusted to vary the gap between the bottom disc and a flat base pad that covered ¾ of the disc (as shown in FIGS. 3B). One quadrant of the disc surface was left opened (i.e. no adjacent base pad) to leave space for the actuator assembly. No pad or surface can be provided where the actuator arm is moving over the surface.

FIG. 3 shows a typical disc drive including a spinning disc 200 and a voice coil motor 209 including a magnet 205. The voice coil motor interacts with an actuator arm shown generally at 211 to position the flexure 215 and slider shown generally at 210 over the surface of the disc. FIG. 3B shows the experimental test fixture of the present invention which is intended to roughly approximate the operating environment of a disc drive and thus include a disc 200, a base plate 201 similar to the base plate underlying the rotating disc, a spindle motor 240 supporting the center of the disc for rotating the disc, and an opening 242 which represents the region where the actuator arm and specifically its pivot 214 would be located adjacent the rotating disc surface.

Single Disc Experiment

Figure 9:
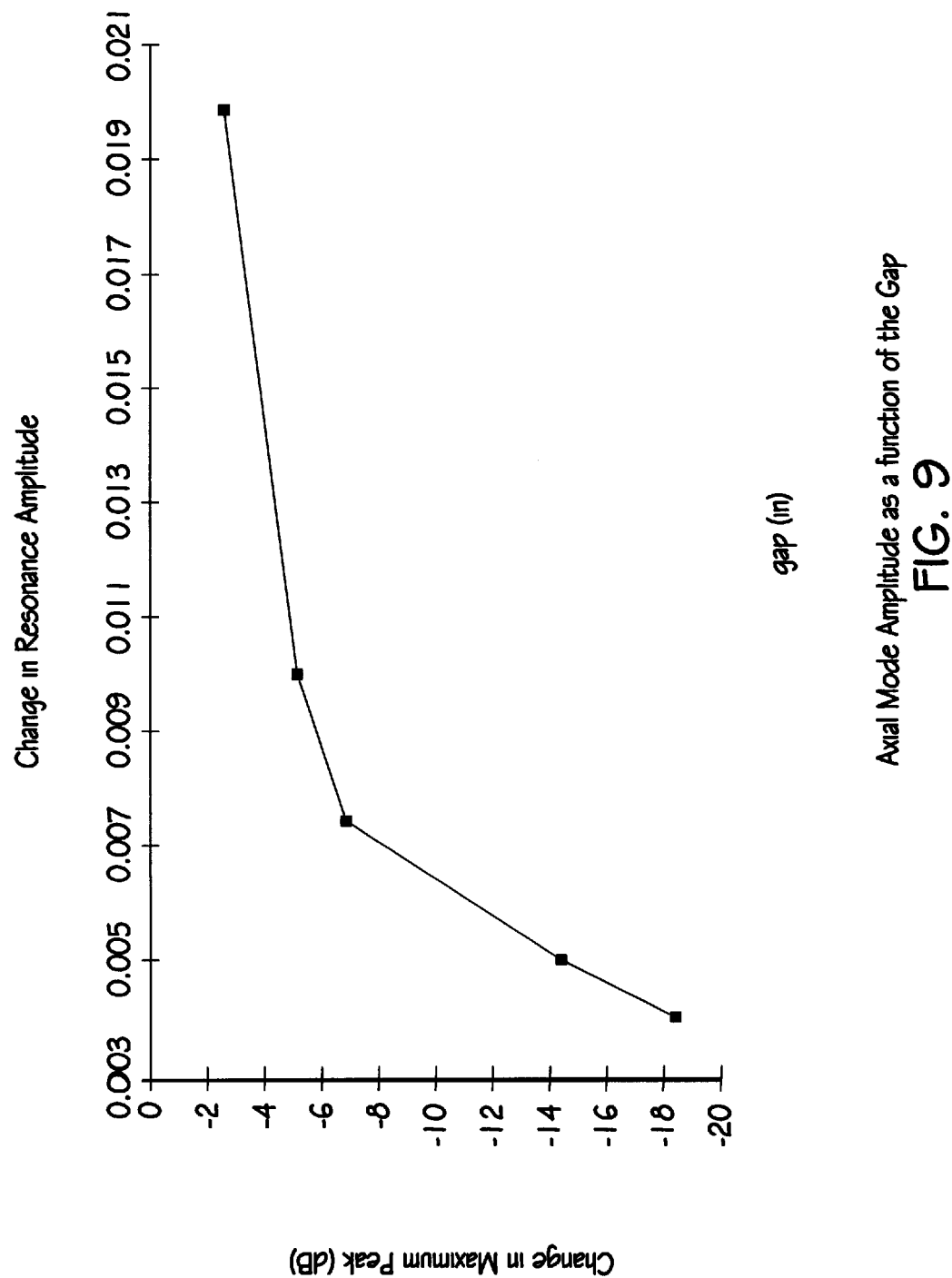

A series of experiments were done using one disc clamped on the spindle. The frequency response of the disc, and spindle run current were measured at 3450 rpm for various gap sizes (0.004"–0.020"). Plots of the frequency responses are shown in FIGS. 4–8. In each figure the bottom trace shows the frequency response for an undamped disc for comparison. FIG. 9 shows the change in amplitude of the axial disc vibrational mode (the peak @1.1 kHz) as a function of the gap.

For illustration: In the current ST 9190 design the gap between the base and the bottom disc is 0.025" based on drawings. The average gap measured on three drives was 0.023". This is slightly larger than the largest gap used in this experiment. In other words, damping levels in the current design are small (damping ratio<1%).

Comparison to Theory

According to the theory presented in the previous section, the damping provided by the squeeze film effect between the disc and base plate should not be a function of the spinning speed. FIG. 10 shows the frequency response of the disc both stationary and spinning with a 0.004" gap, and confirms this to be true. As a result, squeeze film damping could improve non-operational shock performance.

Figure 11:
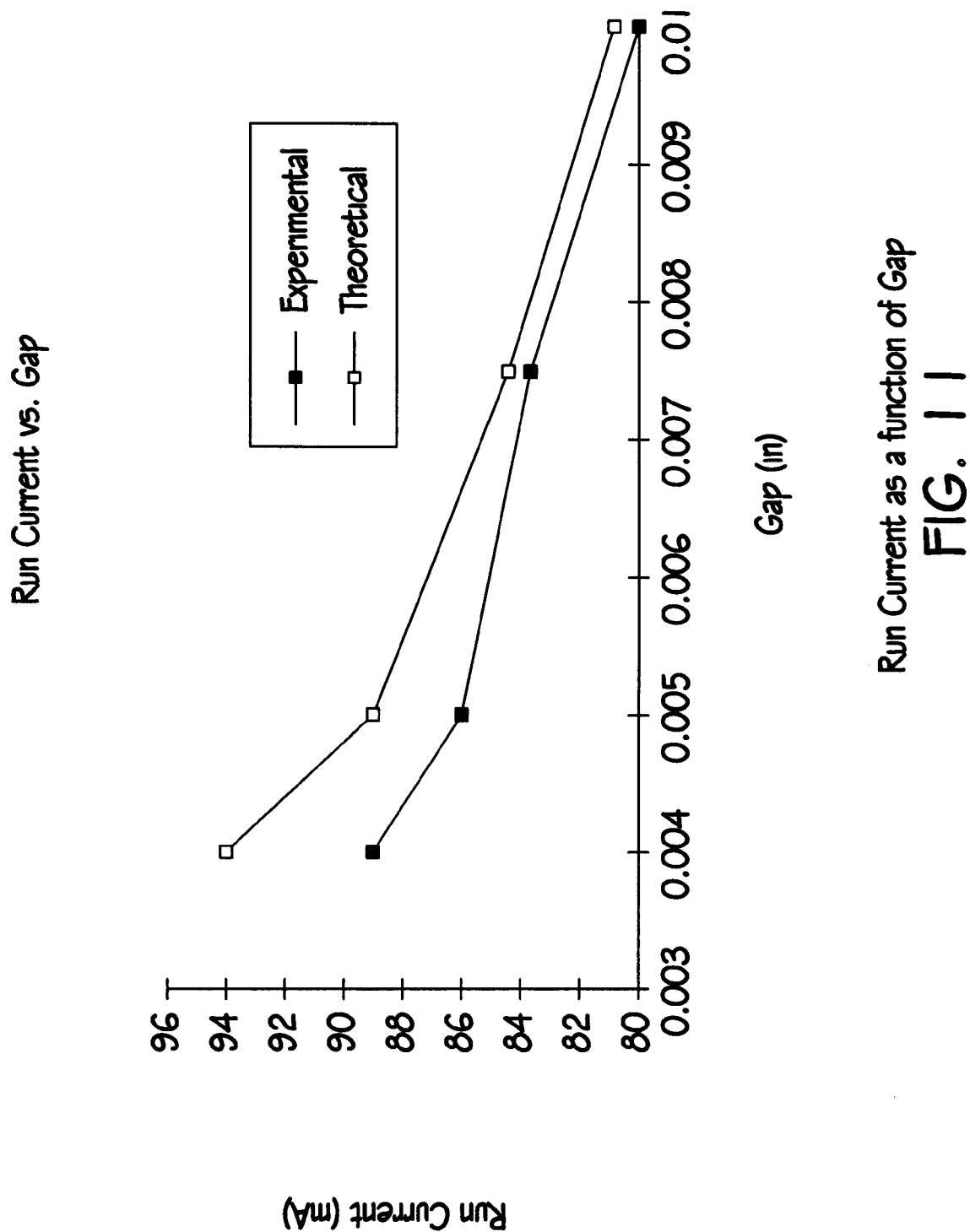
Figure 12:
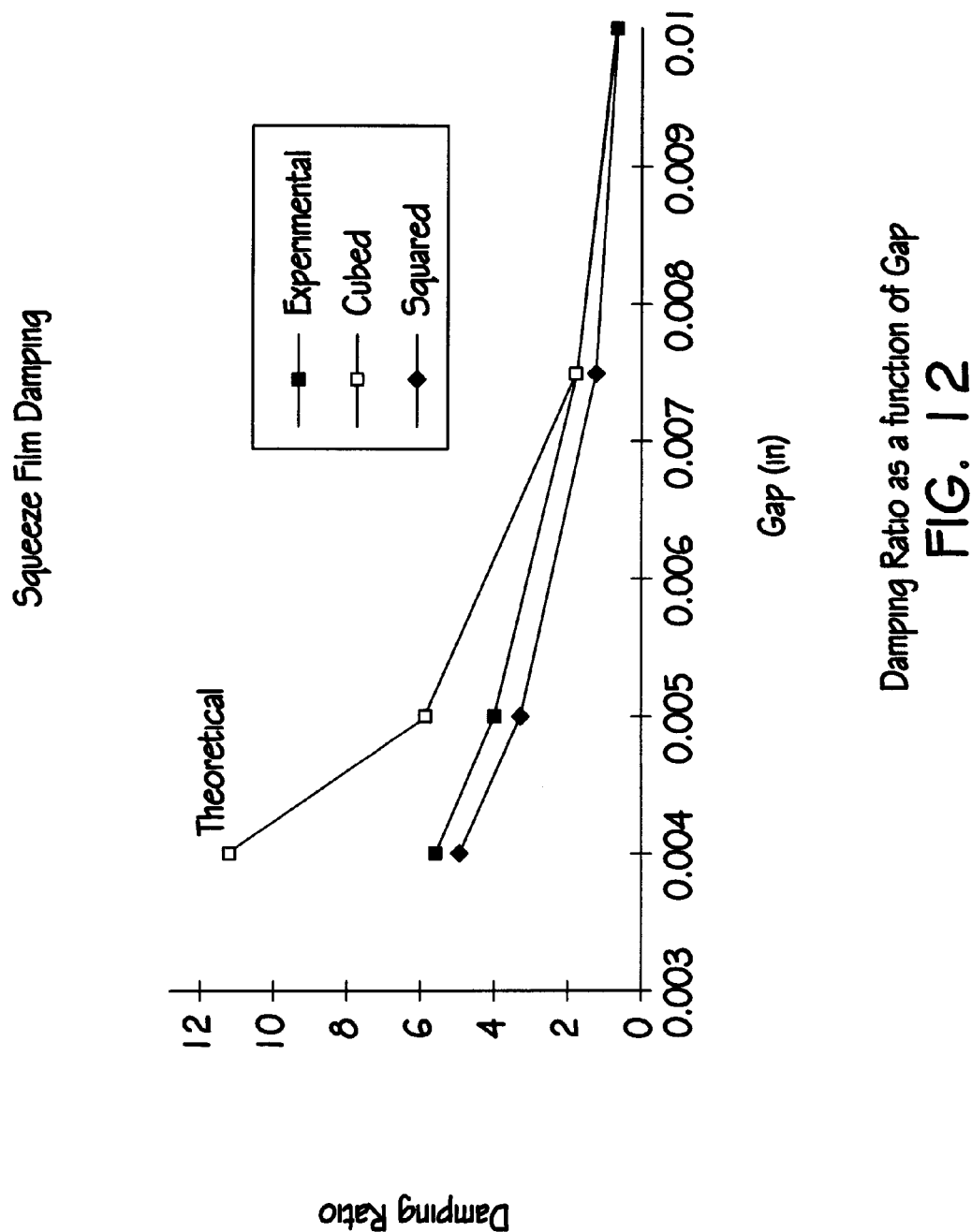

FIGS. 11 and 12 show how the run current and damping ratios compare with theory. In both cases the theory predicts higher values than seen in the experiment.

Two Disc Experiment

Figure 13:
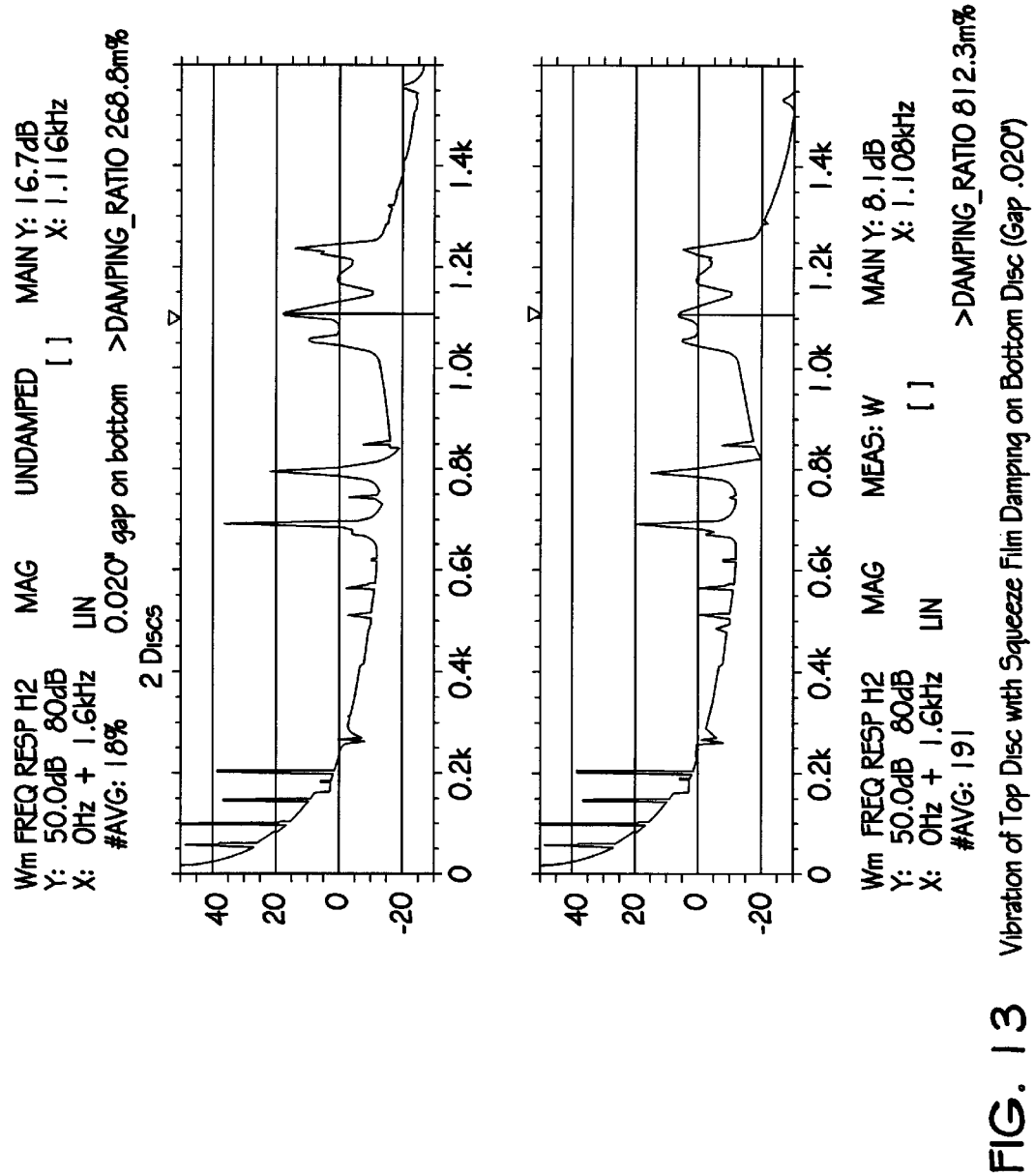
Figure 14:
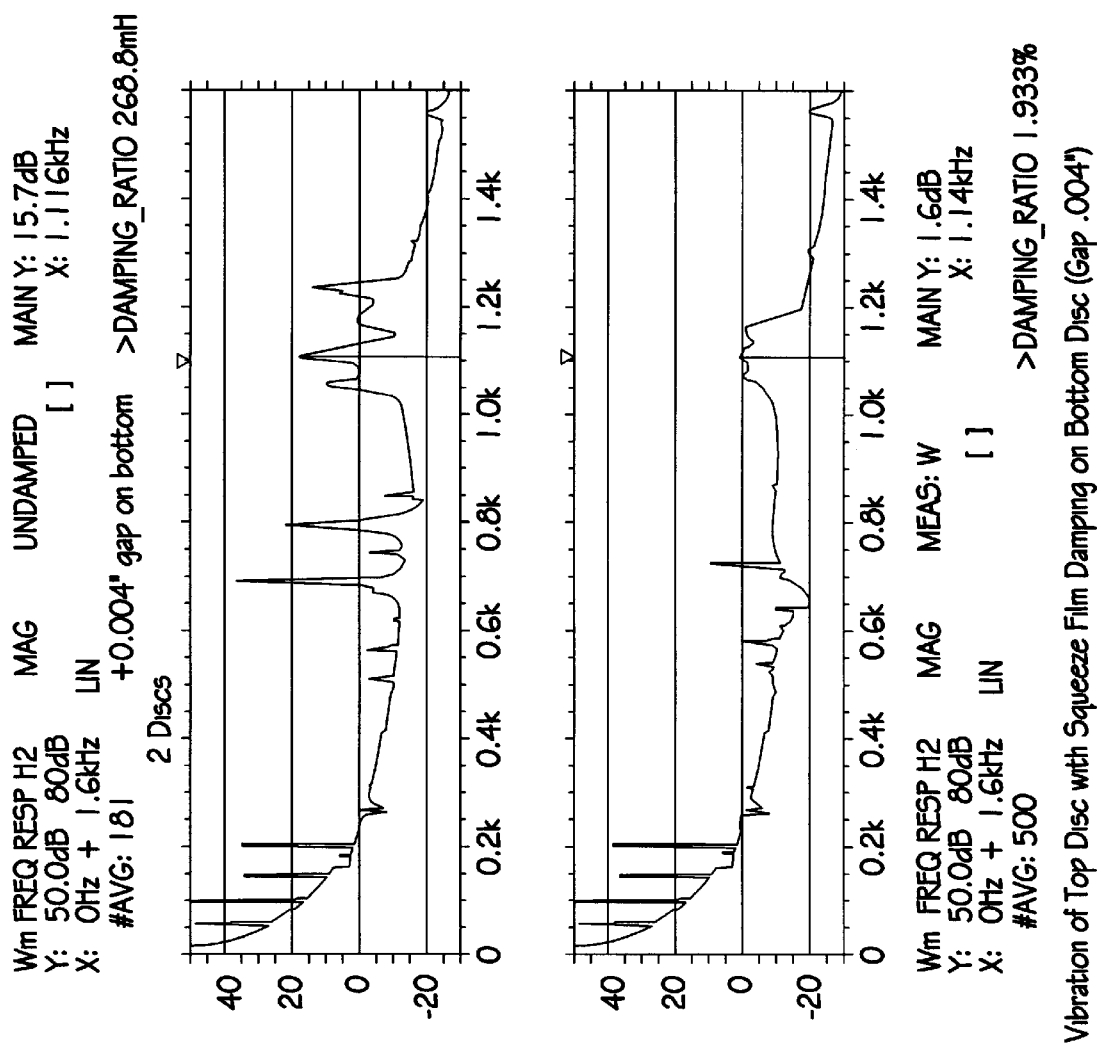

Perhaps the most interesting results from these experiments is the fact that a significant reduction in the vibration of the top disc, in a two disc system, can be achieved by supplying squeeze film damping to the bottom disc alone. This is important because in a practical design, damping discs other than the bottom disc may be difficult. FIGS. 13 and 14 show the frequency response measured on the top disc while providing squeeze film damping to the bottom disc. As can be seen from the figures, the vibration of the top disc is dampened by 8.6 dB for a gap of 0.020", and by 15.1 dB for a gap of 0.004". This level of damping could substantially improve rotodynamic stability problems, such as standard damping changes caused by temperature change, as well as operational vibration performance.

A further set of tests using actual disc drives was performed, using two typical 3½" disc drives with PES (Position Error Signal) problems. Basically, in each of these drives the head could not follow the track within the tolerance limits required by an operational disc drive. In each of the examples shown in FIGS. 15 and 16, the base was built up to within 0.005" of the bottom disc. In each case, the natural frequencies of the disc were damped out to the point where the discs were able to operate within acceptable error limits.

Figure 15:
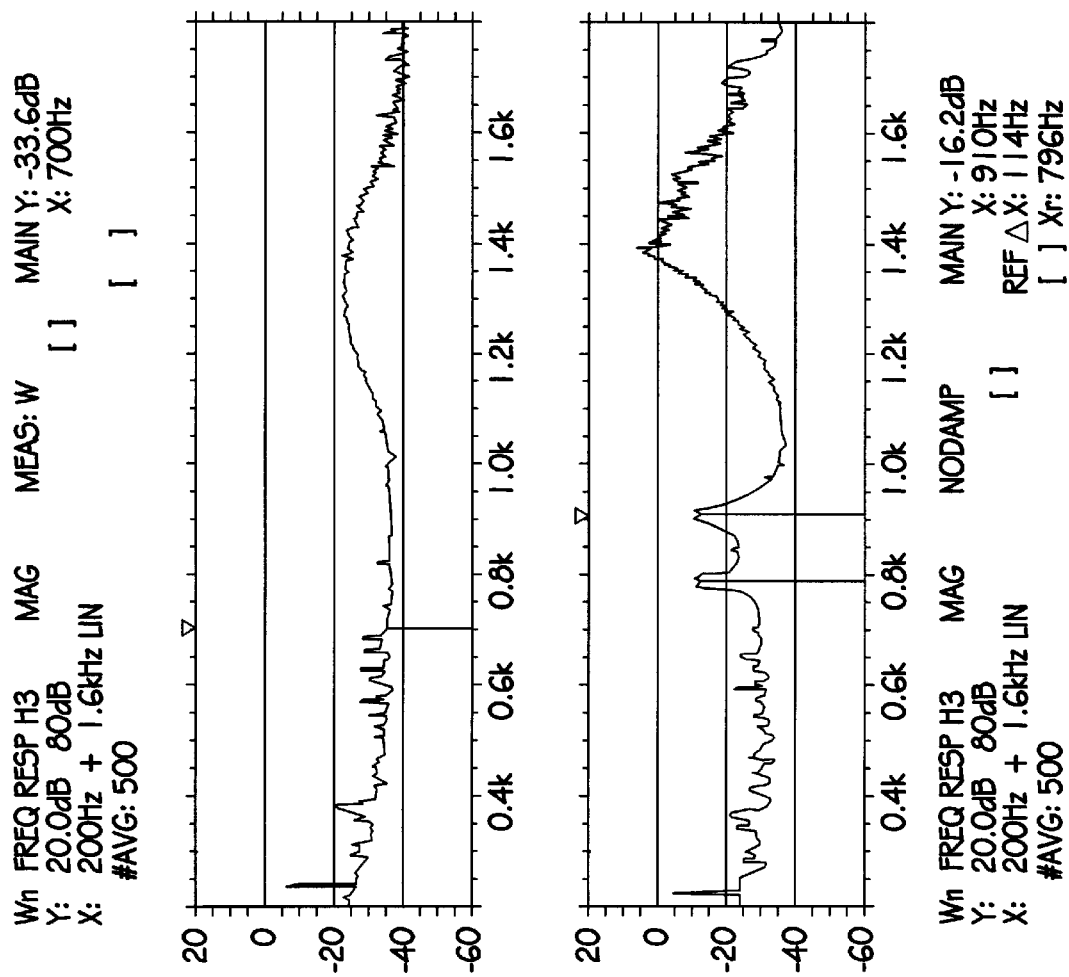
FIGS. 15 and 16 illustrate the test results from incorporating the invention into two disc drives which could not pass operational testing without the invention, and performed within error limits given the benefits of the invention.

In the test results shown in FIG. 15, the vibration of a disc with and without a squeeze film damper was characterized. In the figures, the ordinate is the magnitude of the transfer function which represents the ratio of displacement of the disc to the force applied to vibrate the disc; the abscissa is the frequency of the axial velocity of the disc surface. The lower half of FIG. 15 shows the experimentally measured frequency response function (FRF) for a typical operating disc drive without any squeeze film damper. This is a plot of the vibration measured on the spinning disc as a function of frequency with a white noise excitation. There are three main peaks visible on this plot. The first two are forward and backward gyro modes. At these frequencies, the discs vibrate back and forth like a seesaw with one diameter as a stationary mode. The third peak is an axial vibration of the disc. At this frequency the discs vibrate up and down in an axisymmetric umbrella shape. The top half of the FIG. 15 shows the FRF for the same drive as shown in the lower half with a small (@0.002) gap between the bottom of the disc and the base of the disc drive housing. This small gap creates a squeeze film damper between the disc and the base. As the plot shows, there is a significant reduction in the amplitude of vibration at all frequencies. The forward and backward gyro modes are no longer visible. The axial mode is still visible, but greatly reduced in amplitude. The tests results shown in FIG. 15 were done using white noise as a vibration input.

Figure 16:
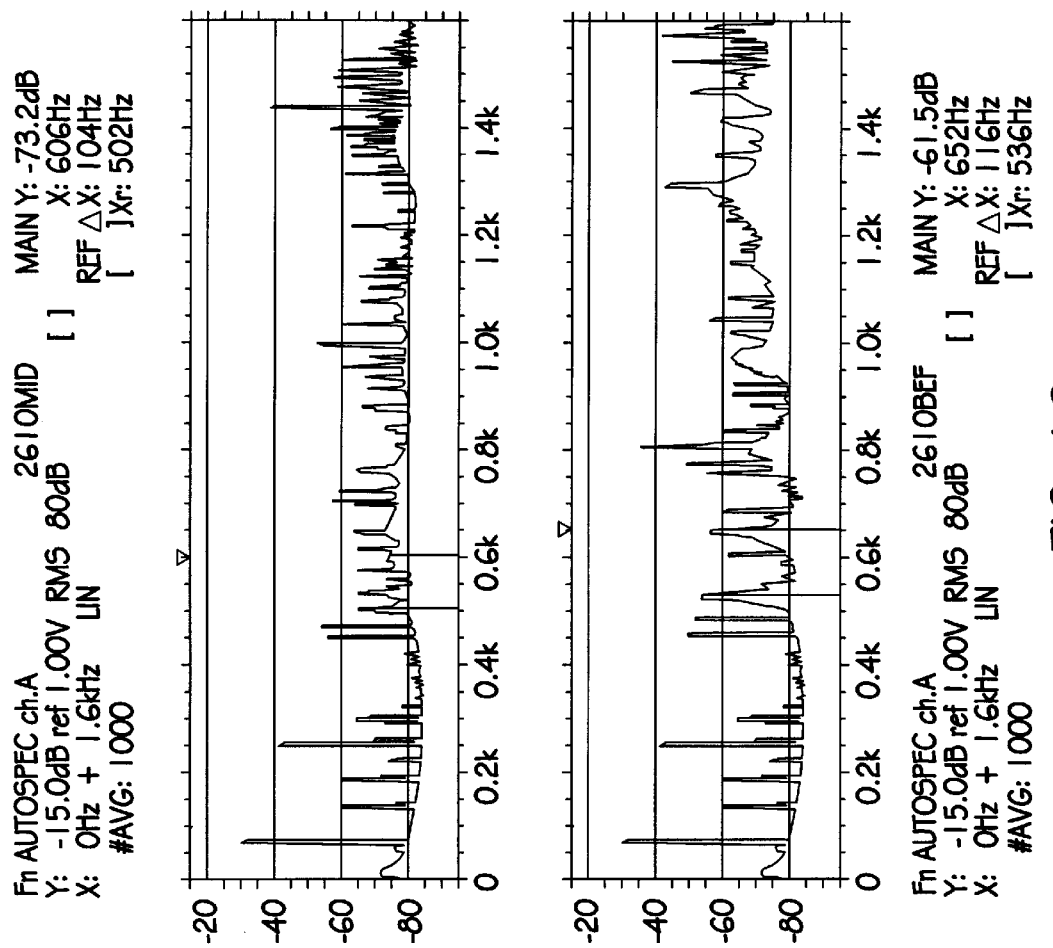

FIG. 16 shows a separate set of test results wherein the major source of excitation in the drive is the spindle motor. This vibration comes from small imperfections in the ball bearings. This type of noise is far different from white noise. White noise has uniform energy at all frequencies, whereas bearing vibrations have energy concentrated at various bearing defect frequencies. This second set of data was generated using a fully functional 3½" drive using only the motor vibration as an input. The drive was selected from regular production but had failed production position error signal (PES) measurement test. This is a test that measures the error in the servo loop that controls the head position over the disc. This error is generally caused by vibration of the spindle motor as it resonates through the discs. In other words, the drive used for the experiment had larger than normal motor and disc vibration under normal operating conditions. The plan for this experiment was to try and create a good drive out of a bad one by the addition of a squeeze film damper. The bottom half of FIG. 16 shows the operating vibration of one of the drives without any squeeze film damper. The two gyro modes can be seen as before. This time there are many spikes on the data however. These are due to the bearing defects mentioned earlier.

The top half of the plot of FIG. 16 shows the operating vibration for the same drive with the addition of the squeeze film damper creating the small gap between the bottom of the lowest disc and the base of the housing. The amplitude of all the resonance peaks is again reduced as in FIG. 15.

The PES test was performed on both drives after addition of the damper. Both drives, which earlier had failed, passed the PES measurement after modification by addition of the damper; therefore, both of these drives, which previously would have had to be discarded, were now usable.

Reviewing the earlier charts and graphs of this description, it can be seen that a substantial amount of damping can be realized by the use of squeeze film damping at the cost of a slightly increased run current. This damping will improve acoustics and operational vibration as well as shock resistance. The obvious question is how difficult and how much will it cost to bring the bottom disc closer to the base plate? In typical 2½" designs, the disc is currently 0.025" above the base plate, and for 3½" drives the distance is 0.035". According to the results presented here, a gap of 0.004"–0.006" for 2½" drives will provide substantial damping (0.006"–0.0010" for 3½" drives). Given the current typical tolerances of the spindle hub flanged mounting surface (+/−0.0015"). These kind of gaps are possible with some careful design of the base casting and machining of the spindle mounting surfaces. Even if the gap is increased from these ideal values, some improvement in damping over current designs is possible. Another obvious concern is what about disc touch down during shock testing? The hydrodynamic pressure profile that is generated due to the squeeze film effect should make this practically impossible. The entire surface of the disc will act like a hydrostatic thrust plate under shock load, providing additional reaction force to counter the inertia of the spindle and discs. This will not only prevent the disc from bottoming out, but help to improve the shock resistance of the bearings. However, this reasoning, while theoretically correct, has not yet been confirmed through experimental testing.

Overall, it is apparent to a person of skill in the art that squeeze film damping is a viable technology that can be used to help improve the dynamic performance of disk drives without drastically changing the fundamental design thereof. The above tests and other testing has demonstrated that the damping is effective between any disc surface and any other surface which is supported separately from the disc mounting. Thus the damping could be between the top disc surface and a surface above it; the bottom disc surface and the surface below it; or a damping surface could even be introduced between the discs. Preferably the damping surface is stationary; but this is not required. It is only necessary that there be motion normal to the surfaces (disc and damping) during vibration. Many gap widths have been tested and shown to be effective. One measure of effectiveness is that the ratio where D is disc diameter C in gap width D and C having consistent units then $\frac{D}{C} > 350$ For example, using a 2.5" disc, D=65 mm then c<65/350= 1857/mm (007") for any appreciable damping to be realized.

For practical reasons, the damping surface can be interrupted i.e. mounted in segments. Segments may be located wither above the top disc, below the bottom disc, or even between adjacent discs. Of course, space must always be left for the actuator arm to move freely. The damping surface is preferably smooth. It may have grooves or other surface structures, which effectively add stiffness to the system as explained in the incorporated application, but this would reduce the effective damping area represented by D in the above ratio. Further, with too many segments, friction will be added. Persons of skill in the art who studied the present invention disclosure can be assumed to be prepared to make modifications thereto without departing from the spirit and scope of the present invention. Therefore, the scope of this invention is to be limited only by the following claims.

What is claimed is:

1. An assembly for a disc drive apparatus for damping resonant vibrations in said disc drive comprising:

at least one disc for storage of information;

a motor for rotating the at least one disc;

a head assembly comprising at least one head for reading and writing information on said disc;

a housing surrounding said at least one disc comprising:
   a top cover having a bottom inner surface facing said disc and a base having a top inner surface facing a bottom surface of said disc;
   at least said base top surface being close enough to said disc to damp vibrations of said disc even in the absence of rotational motion of said disc; and
   wherein said at least one disc is a 3.5" disc, and said gap between said disc and said top or said bottom surface is about 0.006–0.010".

2. An assembly for a disc drive apparatus for damping resonant vibrations in said disc drive comprising:

at least one disc for storage of information;

a motor for rotating the at least one disc;

a head assembly comprising at least one head for reading and writing information on said disc;

a housing surrounding said at least one disc comprising:
   a top cover having a bottom inner surface facing said disc and a base having a top inner surface facing a bottom surface of said disc;
   at least said base top surface being close enough to said disc to damp vibrations of said disc even in the absence of rotational motion of said disc; and
   wherein said disc is a 2.5" disc and a gap between said disc and said top or said bottom surface is about 0.004–0.006".

3. An assembly for a disc drive apparatus for damping resonant vibrations in said disc drive comprising:

a multiplicity of discs for storage of information;

a motor for rotating the discs;

a head assembly comprising a multiplicity of heads for reading and writing information on said discs;

a housing surrounding said discs comprising:
   at least a base having a top inner surface facing a bottom surface of a first disc of said discs;
   said first disc being parallelly proximal a second disc of said discs;
   at least said base top surface being close enough to said first disc to damp vibrations of said disc even in the absence of rotational motion of said disc, the disc being a 2.5" disc and a gap between the top inner surface of the base and the bottom surface of the first disc being 0.004–0.006"; whereby
   vibrations in said second disc being significantly reduced during rotational motion of said discs.

4. An assembly for a disc drive apparatus for damping resonant vibrations in said disc drive comprising:
- a multiplicity of discs for storage of information;
- a motor for rotating the discs;
- a head assembly comprising a multiplicity of heads for reading and writing information on said discs;
- a housing surrounding said discs comprising:
  - at least a base having a top inner surface facing a bottom surface of a first disc of said discs;
  - said first disc being parallelly proximal a second disc of said discs;
  - at least said base top surface being close enough to said first disc to damp vibrations of said disc even in the absence of rotational motion of said disc, the disc being a 3.5" disc and a gap between the top inner surface of the base and the bottom surface of the first disc being 0.006–0.010"; whereby
- vibrations in said second disc being significantly reduced during rotational motion of said discs.

* * * * *